United States Patent [19]

Lowe et al.

[11] Patent Number: 5,864,580
[45] Date of Patent: Jan. 26, 1999

[54] MINIATURE WIRELESS MODEM

[75] Inventors: Peter R. Lowe, Colorado Springs, Colo.; Donald G. Small, Jr., San Juan Capistrano, Calif.

[73] Assignee: HID Corporation, Irvine, Calif.

[21] Appl. No.: 701,527

[22] Filed: Aug. 26, 1996

[51] Int. Cl.⁶ .................. H04B 1/38; H04L 5/16
[52] U.S. Cl. ............ 375/222; 342/42; 340/825.54; 375/220
[58] Field of Search ..................... 375/222, 220, 375/221; 370/315, 316; 340/825.54; 342/42

[56] References Cited

U.S. PATENT DOCUMENTS

| | | | |
|---|---|---|---|
| 4,581,736 | 4/1986 | Dobyns et al. | 370/92 |
| 4,931,788 | 6/1990 | Creswick | 340/825.54 |
| 5,347,280 | 9/1994 | Schuermann | 342/42 |
| 5,374,930 | 12/1994 | Schuermann | 342/42 |
| 5,446,452 | 8/1995 | Litton | 340/870.17 |
| 5,568,512 | 10/1996 | Rotzoll | 375/221 |
| 5,629,981 | 5/1997 | Nerlikar | 380/25 |
| 5,630,204 | 5/1997 | Hylton et al. | 455/3.3 |
| 5,631,631 | 5/1997 | Deschenes | 340/572 |
| 5,635,907 | 6/1997 | Bernard et al. | 340/573 |
| 5,640,002 | 6/1997 | Ruppert et al. | 235/472 |
| 5,640,164 | 6/1997 | Gunnarsson | 342/42 |
| 5,642,103 | 6/1997 | Tokuda et al. | 340/825.54 |
| 5,652,570 | 7/1997 | Lepkofker | 340/573 |
| 5,659,985 | 8/1997 | Stump | 37/348 |
| 5,686,920 | 11/1997 | Hurta et al. | 342/42 |

*Primary Examiner*—Stephen Chin
*Assistant Examiner*—Mohammad Ghayour
*Attorney, Agent, or Firm*—Rodney F. Brown

[57] ABSTRACT

A wireless modem employs a radio frequency (RF) transponder system components to remotely access the memory of an electrical or electro-mechanical device by providing an exciter/reader/writer (ERW) circuit free of electrical contact with the electrical or electro-mechanical device and a transponder including a transmit/receive antenna, a reading circuit, a programming circuit, and a transponder memory. The transponder memory is directly connected to the device memory. The ERW circuit initially generates an RF excitation signal powering the transponder. In response to the RF excitation signal, the transponder generates a RF response signal using the reading circuit that is transmitted back to the EWR circuit. The RF response signal includes data from the device memory. The RF response signal is received by the ERW circuit, which in turn generates an RF write signal that is transmitted to the transponder. The RF write signal powers the transponder and programs the device memory using the programming circuit of the transponder.

30 Claims, 4 Drawing Sheets

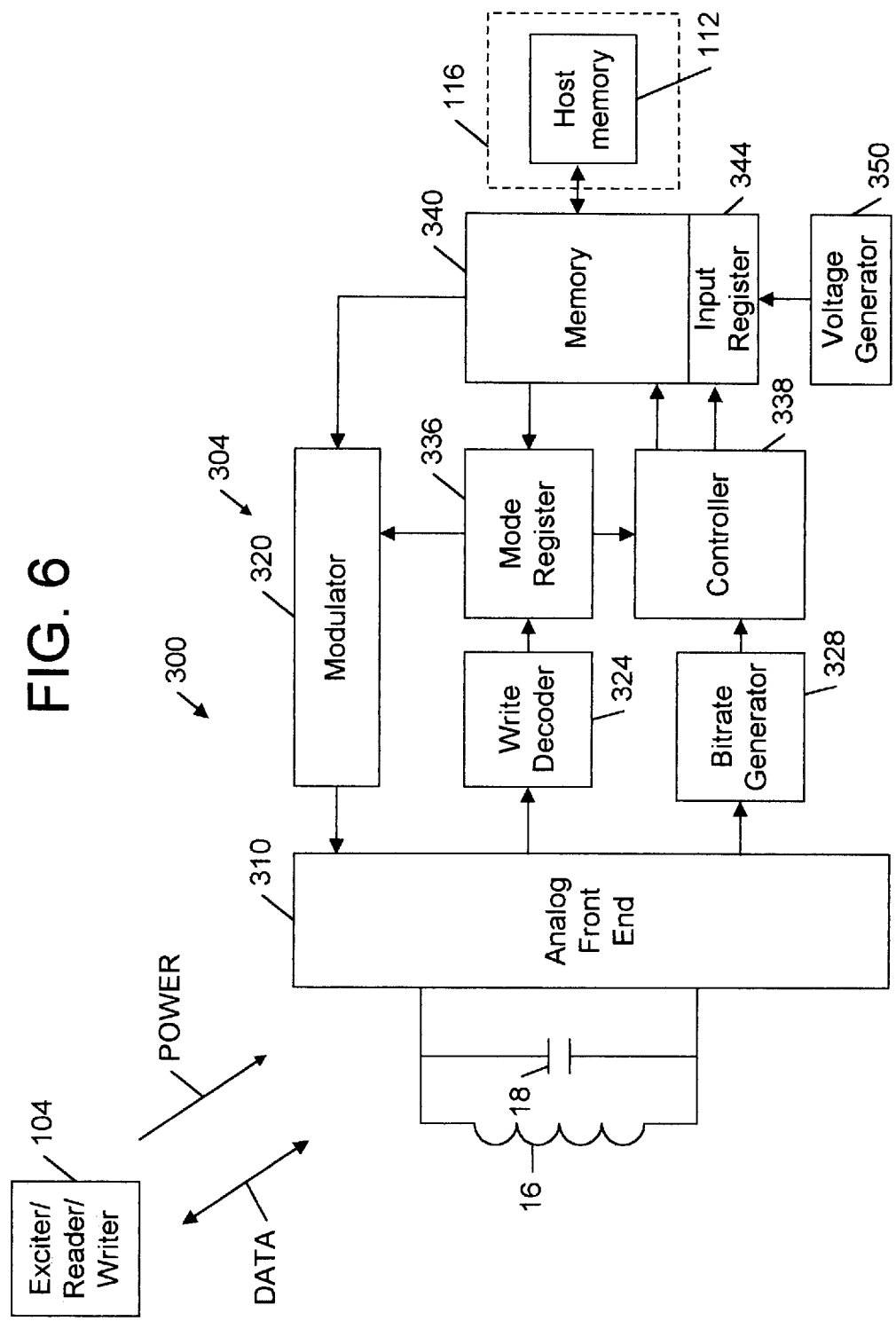

MINIATURE WIRELESS MODEM

TECHNICAL FIELD

The present invention relates generally to wireless modems, and more particularly to a method for utilizing the communications protocol and hardware of a radio frequency identification (RFID) transponder system as a low-cost, miniature wireless modem.

BACKGROUND OF THE INVENTION

Microprocessors and their associated memory are used to improve the operation, usability, and control of many electronic and electro-mechanical products. Typically, the memory of these products includes non-volatile memory that advantageously preserves important system data when the power supply to the product is turned off, disconnected, or otherwise rendered inoperative. Such system data may include default configuration data required during startup of the microprocessor or diagnostic data that facilitates the identification of operational problems.

As the use of microprocessors and associated memory in electronic and electro-mechanical products proliferates, there is an increasing need to access system data stored in the non-volatile memory for diagnostic and/or data modification purposes. For example, if a product becomes inoperable, it is generally desirable to access system data stored in the memory to search for data errors. If an error is found in the system data, it is necessary to correct the system data stored in the memory, thereby restoring the product to proper operation.

Access to the memory oftentimes requires costly diagnostic devices that are connectable to the memory of the product via direct electrical contact therewith. Although some diagnostic devices are connectable to the memory of the product via indirect electrical contact, such as via a user interface integral with the product, these devices have limited utility because they are generally only applicable if the user interface, and correspondingly the product, is functioning properly. Diagnostic devices that are connectable to the memory of a product via direct electrical contact are also problematic in cases where the memory resides in a relatively inaccessible location within the product, rendering direct electrical contact between the diagnostic device and the memory extremely difficult. In such cases, it may be necessary for a technician to disassemble the product before the memory is accessible, which requires a significant amount of time and substantially increases the cost of servicing the product.

There are other cases where it is not practical to access the non-volatile memory of a microprocessor via direct or indirect electrical contact, such as in the case of a field replaceable unit (FRU) for a computer. An exemplary FRU is a computer circuit board having a microprocessor and an associated non-volatile memory, wherein the memory is powered by a battery when the memory is disconnected from its external power source. The non-volatile memory usually contains important system data read by the computer during startup and/or operation of the computer. It is sometimes necessary to read the system data stored in the non-volatile memory of the FRU or to correct, update, or replace the system data stored therein, particularly when the computer is shut off, malfunctioning or otherwise inoperable. Yet the contents of the non-volatile memory are not readily accessible by indirect electrical contact under these conditions because the user interface of the computer is often correspondingly inoperable. Thus, the computer must be disassembled to access the memory via direct electrical contact. Disassembly, however, is an unsatisfactory alternative, as noted above, due to the high costs associated therewith.

Still another alternative is to access the non-volatile memory using a conventional contactless communication device such as a wireless modem. Wireless modems are used to transfer data between remote locations without requiring electrical contact therebetween. Conventional wireless modems, however, have a relatively high cost that prevents or discourages their use in low-cost products. Conventional wireless modems are also too large for use in products where miniaturization is required.

Accordingly, it is an object of the present invention to provide a wireless modem that allows communication with the memory of an electrical or electromechanical host device without requiring connection therebetween by either direct or indirect electrical contact. It is another object of the present invention to provide a wireless modem that is small in size. It is yet another object of the present invention to provide a wireless modem that is relatively low in cost. These objects and others are achieved by the present invention described hereafter.

SUMMARY OF THE INVENTION

The present invention is a method for remotely accessing a memory of an electrical or electromechanical device by means free of direct or indirect electrical contact with the device memory. In accordance with the method, a remote exciter/reader is provided that is free of electrical contact with the memory of the electrical or electro-mechanical device. A transponder is also provided, including an antenna, a reading circuit, and a transponder memory. The transponder memory is in direct electrical contact with the device memory.

The method is initiated by generating a radio frequency (RF) excitation signal using the exciter/reader and transmitting the RF excitation signal to the transponder. The RF excitation signal powers the transponder, causing the reading circuit of the transponder to generate an RF response signal that includes data from the device memory. The RF response signal is transmitted via the antenna back to the exciter/reader where the RF response signal is read.

In another aspect of the invention, the exciter/reader includes a writer that generates an RF write signal. The transponder includes a programming circuit and the device memory is programmed with the RF write signal using the programming circuit. In yet another aspect of the invention, the electrical or electromechanical device is a computer circuit board including a microprocessor and a memory. The circuit board is mounted within a computer housing. The data from the device memory contained in the RF response signal includes system data relating to the operation of the microprocessor, operational data relating to the operational parameters of the circuit board, service data relating to repairs made to the circuit board, or use data relating to the use of the circuit board.

The present invention will be further understood, both as to its structure and operation, from the accompanying drawings, taken in conjunction with the accompanying description, in which similar reference characters refer to similar parts.

BRIEF DESCRIPTION OF THE DRAWINGS

FIG. 6 is an electronic schematic and block diagram of a second wireless modem according to the present invention.

DESCRIPTION OF PREFERRED EMBODIMENTS

Radio frequency (RF) transponder systems are used to communicate between remote locations without electrical contact therebetween. RF transponder systems generally include an exciter/reader (ER) and a transponder, otherwise termed an RF identification (RFID) tag. The ER generates an RF excitation signal and transmits it to the transponder that is energized thereby, causing the transponder to generate an identification signal or other data signal and transmit it back to the ER at a particular frequency. Some ERs are also capable of generating a write signal and transmitting it to the transponder, enabling modification of the data signal generated by the transponder. These ERs are referred to herein as exciter/reader/writers (ERWs). RF transponder systems are commonly used to identify or indicate the presence of an object to which the RFID tag is connected or to transmit information relating to a physical condition such as the air pressure of a tire or the temperature of a fluid in a container.

Figure 1:
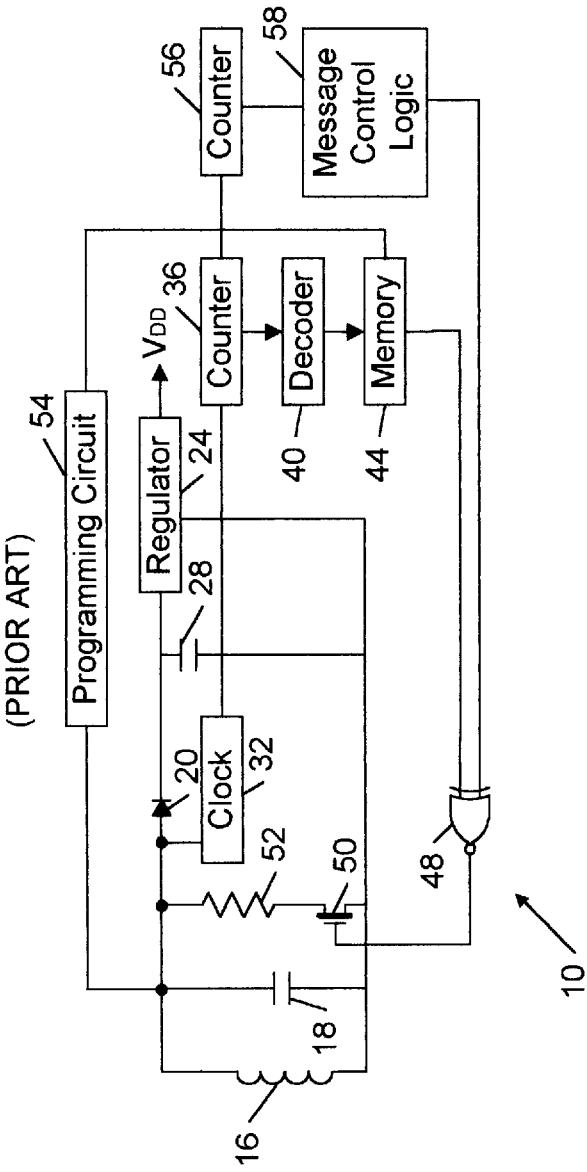
FIG. 1 is a block diagram and electrical schematic of a transponder according to the prior art.

The transponder generally employs a single antenna coil to receive the RF excitation signal and to transmit the identification signal back to the ERW. A system of this type is described in U.S. Pat. No. 4,730,188 to Milheiser, incorporated herein by reference. Referring to FIG. 1, a conventional transponder is illustrated and generally designated 10. The transponder 10 includes a parallel-resonant antenna circuit that typically includes an antenna coil 16 in parallel with a capacitor 18. Skilled artisans will appreciate that separate receive and transmit antennae can be employed. The capacitor 18 may be omitted when the parasitic capacitance of the antenna coil 16 is sufficient to cause resonance. The antenna coil 16 receives the RF excitation signal from an ER or ERW (not shown in FIG. 1) and provides an input to a rectifier 20 and a shunt regulator circuit 24. Although illustrated as a single diode, the rectifier circuit 20 can also be a full-wave rectifier circuit. In combination with the regulator circuit 24, the rectifier 20 provides positive and negative voltage levels ($V_{DD}$) or a positive voltage level ($V_{DD}$) and ground for the remaining components of the transponder 10. A capacitor 28, coupled to an output of the rectifier 20, reduces voltage ripple of the rectified voltage.

A clock 32 increments a counter 36 at a rate typically equal to the frequency of the RF excitation signal. The output of the counter 36 is coupled to a decoder circuit 40 that includes serial address logic for a memory 44 which is preferably electronically erasable programmable read only memory (EEPROM). The memory 44 stores an identification code for the transponder 10 and outputs the identification code to one input of an exclusive NOR gate 48 when the counter 36 has reached a predetermined count. The identification code uniquely identifies the transponder 10 and the object to which the transponder 10 is attached.

The identification output from the memory 44 is typically encoded into Manchester format. A sync character different in format from the encoded identification code is inserted at the beginning of the frame and the composite signal is then encoded in a frequency shift key (FSK) format before being applied to the exclusive NOR gate 48. The FSK identification code is applied to the antenna coil 16 via a field effect transistor (FET) 50 and a resistor 52 that are connected in parallel with the antenna coil 16. The transmission from the antenna coil 16, that includes the identification code, is received by the ER or ERW.

The identification code can be programmed into the memory 44 either by physical contact or by RF transmission (via a magnetic field). Programming through direct contact is shown in U.S. Pat. No. 4,730,188 to Milheiser. Alternately, a programming circuit 54 of FIG. 1 allows contactless programming of the memory 44. The programming circuit 54 typically requires the ERW to transmit a password. If the proper password is received, the programming circuit 54 writes the data received via the antenna coil 16 and capacitor 18 into the memory 44. Several different contactless programming methods are also known including "Coded Information Arrangement", U.S. Pat. No. 4,399,437 to Falck et al. and commonly assigned applications entitled "Contactless Programmable Radio Frequency Transponder", U.S. Pat. Ser. No. 08/540,631, filed Oct. 11, 1995, "RF Identification Tag and Contactless Method of Programming the Same", U.S. Pat. Ser. No. 08/514,712 filed Aug. 14, 1995, and "High Field Programmable Transponder System and Method", U.S. Pat. Ser. No. 08/316,653, filed Sep. 30, 1994, all of which are hereby incorporated by reference. Still other methods of contactless programming will be apparent to skilled artisans.

The counter 36 provides an output to another counter 56 that drives message control logic circuit 58. The message control logic circuit 5-8 provides a frame for the message stream such that a Manchester code violation occurs for the first four bits of the message. This code violation is interpreted by the ER or ERW as the beginning of a frame. The messages are produced continuously as long as the transponder 10 is energized by the RF excitation signal. The outputs of the memory 44 and the message control logic circuit 58 are gated through the exclusive NOR gate 48.

The above-described conventional transponders have been used to transmit identification codes from a remote location or to transmit data relating to a physical condition such as tire pressure and fluid or air temperature in difficult to reach positions. Reprogramming the transponder has generally been limited to changing the identification code of the transponder. Transponders that transmit data related to dynamic physical conditions generally do not require or provide contactless programming.

Figure 2:
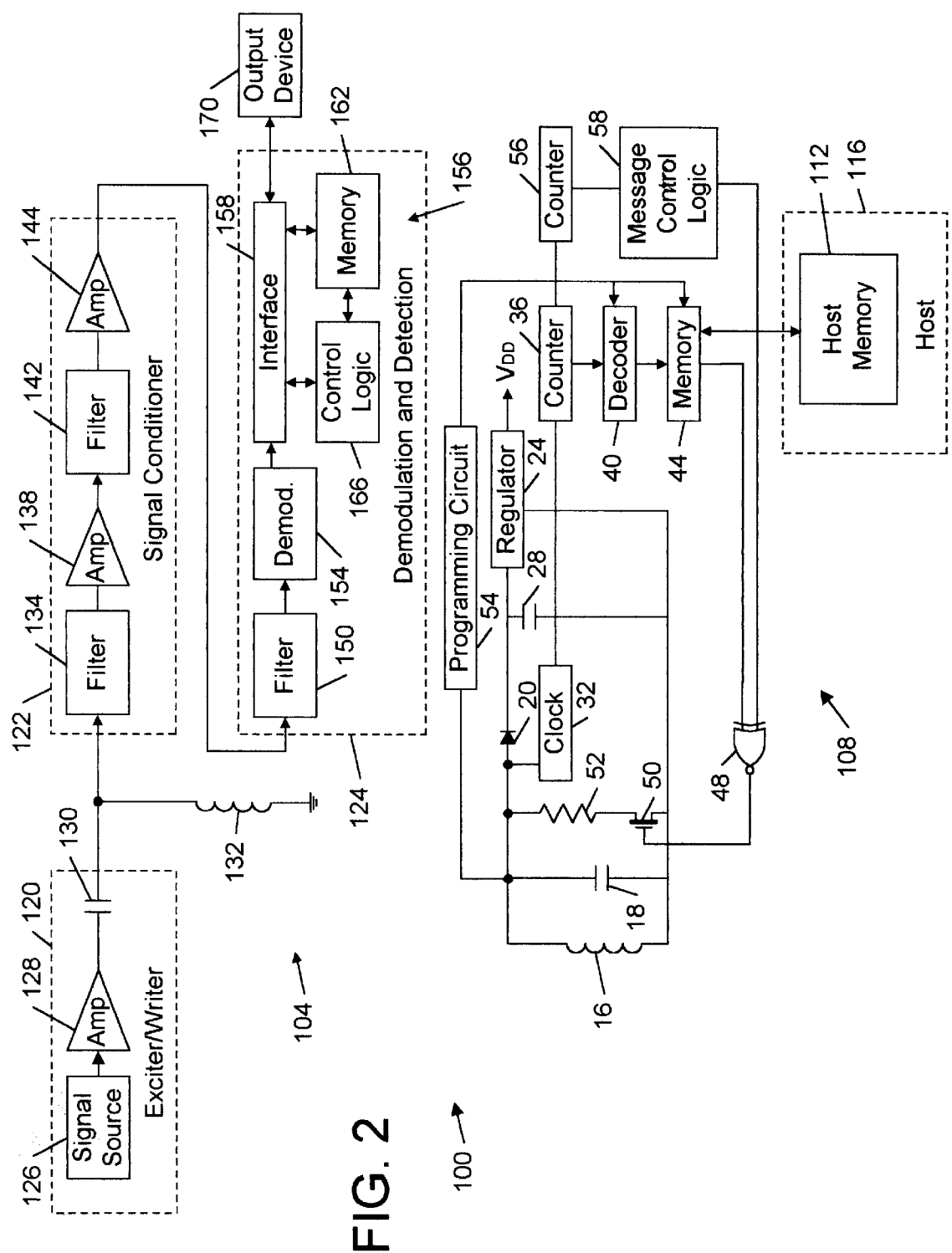
FIG. 2 is a block diagram and electrical schematic of a first wireless modem according to the present invention.

Referring to FIG. 2, a wireless modem according to the present invention is illustrated and is generally designated 100. The wireless modem 100 includes an ERW circuit 104 and a transponder 108. The memory 44 of the transponder 108 is coupled to the memory 112 of a host 116. As can be appreciated, the wireless modem 100 allows the memory 112 of the host 116 to be accessed remotely without requiring connection via direct electrical contact. In other words, data can be written to or read from the memory 112 of the host 116 in a contactless manner.

Various different ERWs 104 can be used depending upon the desired operating range and frequency. A suitable ERW circuit 104 for short range applications is the MINIPROX Reader available from HID Corporation, Tustin, Calif., USA, that can be mechanically configured for mounting in various types of environments. The ERW circuit 104 has three main functional units: an exciter/writer (EW) circuit 120, a signal conditioner circuit 122, and a demodulation and detection circuit 124.

The EW circuit 120 consists of an AC signal source 126 followed by a power amplifier 128 that amplifies the signal generated by the AC signal source 126 to provide a high current, high voltage excitation signal to a capacitor 130 and an antenna coil 132. The inductance of the antenna coil 132 and the capacitance of the capacitor 130 are selected to resonate at the excitation signal frequency so that the voltage across the antenna coil 132 is greater than the voltage output of the power amplifier 128. The AC signal source 126 provides an RF excitation signal that can include a password, an identification code for the transponder 108, and/or a write signal to be written into the memory 44 of the transponder or the memory 1 12 of the host 116 to alter data stored therein.

The signal conditioner circuit 122 is also coupled to the antenna coil 132 and serves to amplify the RF response signal generated by the transponder 108. The signal conditioner circuit 122 filters out the RF excitation signal frequency as well as other noise and undesired signals outside of the frequency range of the transponder signals. The signal conditioner circuit 122 includes a first filter 134 that passes the RF response signal frequency returned from the transponder 108. A first amplifier 138 increases the signal strength of the signal output by the first filter 134. A second filter 142 passively excludes high energy signals at the excitation frequency. A second amplifier 144 increases the signal strength of the signals output by the second filter 142. Preferably the first and second filters 134 and 142 include bandpass and bandstop filters. Skilled artisans can appreciate that the relative positions of the first and second filters can be switched or a higher order filter providing both bandpass and bandstop filtering functions can be employed. The first and second amplifiers 138 and 144 can be combined into a single amplifier.

The amplified output of the signal conditioner circuit 122 is input to a filter 150 of the demodulation and detection circuit 124 that further reduces the RF excitation signal energy. Preferably the filter 124 is a low pass filter. The demodulation and detection circuit 124 also includes a demodulation circuit 154 and a microcomputer that is generally designated 156. The microcomputer 156 includes an input/output interface 158, a memory 162, and a microprocessor or control logic 166. The demodulation circuit 154 is typically a FSK demodulator that includes a phase-locked loop circuit configured as a tone detector. The demodulation circuit 154 and the microcomputer 156 extract data from the RF response signal that includes data from the memory 112 of the host 116. To extract the data, digital signals are generated when the return signal from the transponder 108 shifts between two frequencies. The timing of the transitions of the digital signals between the logic levels or frequencies is detected. The information obtained by the microcomputer 156 can be stored in the memory 162 or transferred to an output device 170 such as a display, a printer, a network, another computer or other devices or storage media.

Figure 3A:
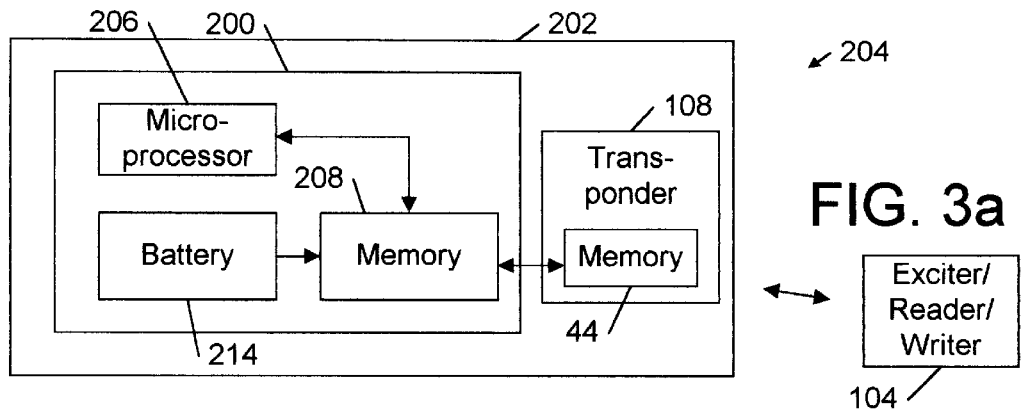
FIGS. 3a and 3b are block diagrams of an exemplary application for the first wireless modem of the present invention which includes a transponder coupled to or integrated with the non-volatile memory of a computer circuit board located inside a computer housing and an exciter/reader/writer located outside the computer housing for transmitting and receiving data from the non-volatile memory of the computer circuit board.

FIG. 3*a* illustrates an exemplary application of the present invention. A circuit board 200 (analogous to the host 116 in FIG. 2) is located within a computer housing 202 of a computer 204. The circuit board 200 includes a microprocessor 206 coupled to a non-volatile memory 208 (analogous to the host memory 112 in FIG. 2). A battery 214 coupled to the non-volatile memory 208 powers the non-volatile memory 208 when the external power supply (not shown) of the computer 204 is inoperative or disconnected. The transponder 108 is preferably located adjacent the circuit board 200 or is a plug-in module on the circuit board 200. The memory 44 of the transponder 108 is connected by electrical contact to the non-volatile memory 208 of the computer 204.

Figure 3B:
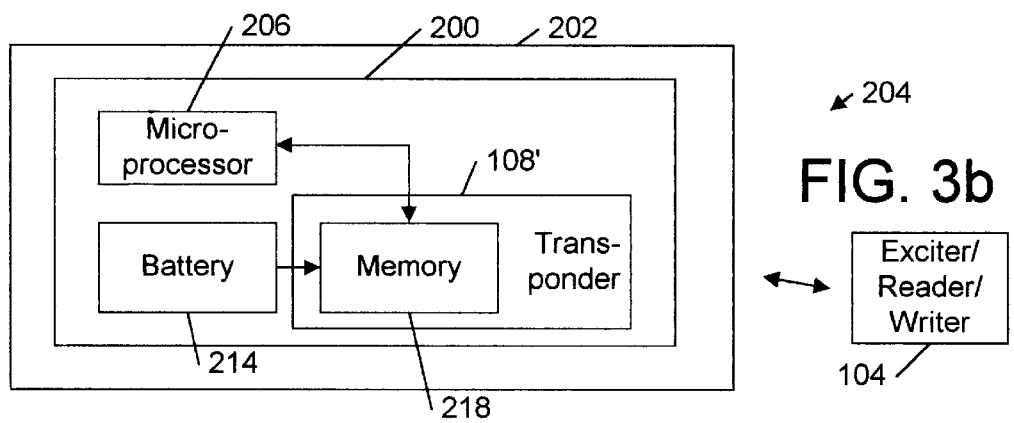

The ERW circuit 104 is maintained in a fixed position relative to the computer 204 by means of a fixture (not shown) or is alternatively portable. As can be appreciated, the wireless modem of the present invention allows data to be transmitted to and/or read from the non-volatile memory 208 of the computer 204 to facilitate inventory control, reprogramming, repair, and diagnostics. In FIG. 3*b*, the transponder 108' is fabricated on the circuit board 200. The memory 44 of the transponder 108' and the non-volatile memory 208 coupled to the microprocessor 206 are integrated into a non-volatile memory 218. The wireless modems in FIGS. 3*a* and 3*b* operate in a manner similar to the wireless modem 100 described above with reference to FIG. 2. The antenna coil 16 is preferably part of the artwork of the printed circuit board 200.

The non-volatile memory 208 or 218 of the computer 204 illustrated in FIGS. 3*a* and 3*b* commonly contains system information that is stored even when power to the computer 204 is off. The non-volatile memory 208 or 218 is typically powered, even when the computer 204 is switched off, by means such as a lithium battery. Alternatively, the non-volatile memory may be of a type that retains information, even when there is a total absence of power, such as an EEPROM memory (not shown). Using the wireless modem of the present invention, the contents of the memory 208 or 218 can be read and/or written to even if the computer 204 is off and/or not functioning properly due to software or hardware problems. The memory 208 or 218 can be read or written to in an electrical contact free manner and without requiring the user interface of the computer 204. An opening (not shown) may be required in the computer housing 202, depending upon the construction of the computer housing 202 and upon the frequency and signal strength of the RF excitation and response signals generated by the wireless modem, enabling the signals to pass into or out of the housing 202. If the non-volatile memory is an EEPROM memory (not shown), the wireless modem supplies power thereto enabling the memory to be read.

In addition, the traditional use of the non-volatile memory can be extended to include other information such as usage data (for example, time and date of last use and accumulated time of use), operational data (for example, the number of disk accesses and bad reads), service data (for example, the last date serviced and items replaced and/or repaired), and configuration data (for example, a manifest of all hardware and software items installed in the computer system). The applications of the wireless modem of the present invention include inventory control and management, product billing, and problem diagnosis in the field.

For example, the system settings stored in the computer 204 may be incorrect for the hardware or software installed on the computer 204. The incorrect system settings may prevent the computer 204 from booting up and/or operation of a user interface. A technician reads the data stored in the non-volatile memory using the wireless modem of the present invention to identify the installed hardware and software components from the manifest stored in the memory 208 or 218. The technician compares the system settings stored in the non-volatile memory 208 or 218 with the correct system settings for the installed hardware and software components to determine whether the settings are valid. If the system settings are incorrect, the technician writes correct system settings into the memory 208 or 218 using the wireless modem. If the system settings are correct, the technician accesses prior service and use information to further diagnose the malfunction.

Figure 4:
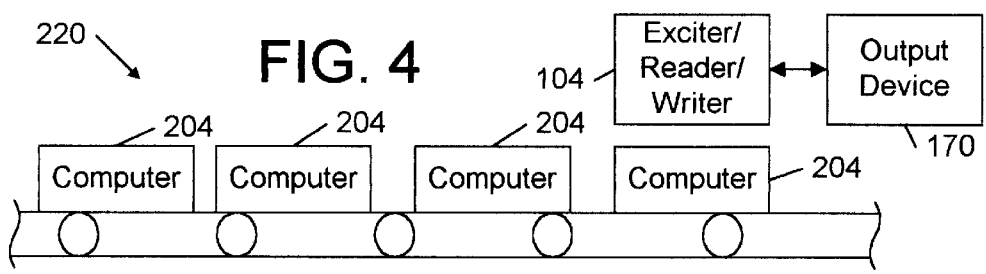
FIG. 4 is a block diagram illustrating the wireless modem of the present invention in use on an assembly line.

FIG. 4 illustrates one use for the wireless modems illustrated in FIGS. 3a and 3b. As the computers 204 move down an assembly line 220 after assembly, the ERW circuit 104 transsmits data to or reads data from the non-volatile memory 208 or 218 associated with the microprocessor 206. The ERW circuit 104 writes configuration data and system settings into the memory 208 and 218. Later, another ERW circuit reads the data for quality assurance, for generating a packing list with all installed hardware and software components, or other such applications. The ERW circuit 104 stores the received data in the memory 162 (FIG. 2) of the transponder 100 or outputs the received data to the output device 170. As can be appreciated, the ERW circuit 104 preferably reads the software and hardware manifest that details the installed hardware and software components on each computer for billing, inventory and pricing purposes.

Figure 5:
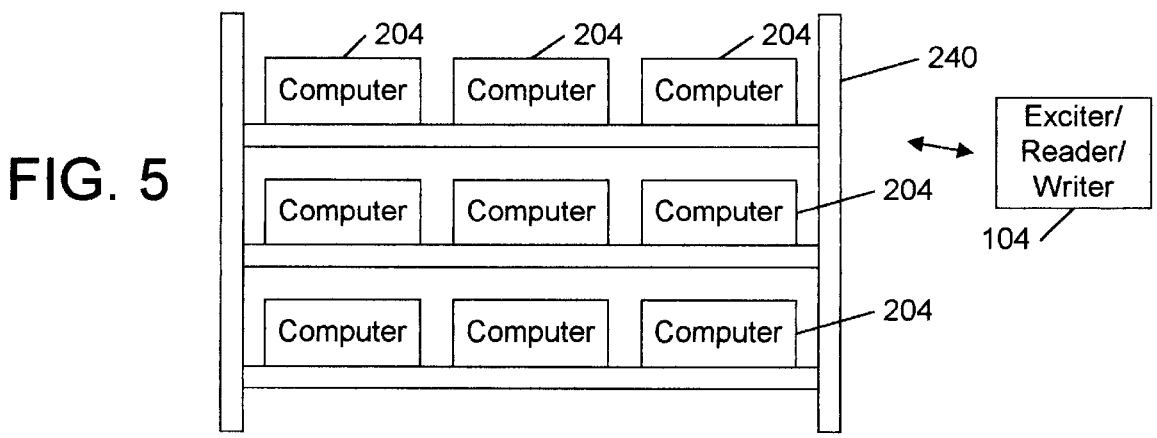
FIG. 5 is a block diagram illustrating the wireless modem of the present invention in use in a warehouse.

FIG. 5 illustrates another suitable application for the wireless modem of the present invention. A portable ERW circuit 104' is used to read data from or write data to a non-volatile memory associated with one or more computers 204 located on warehouse shelves 240. The retailer or wholesaler can use the information to quickly locate a computer having the desired software and hardware components installed.

The wireless modem can also be used with other products that include a non-volatile memory. For example, a non-volatile memory associated with electronics of a vehicle can be used to store use data (for example, time and date of last use and accumulated time of use), operational data (for example, number of miles driven and average speed), service data (for example, last date serviced and items replaced and/or repaired), vehicle data (for example, options installed on the vehicle or diagnostic data relating to failed parts). Skilled artisans can appreciate that the wireless modem can be used in numerous other applications such as with printers, kitchen appliances, cameras, heating and cooling controls and other electronic and electromechanical devices containing a non-volatile memory.

Referring to FIG. 6, an alternate wireless modem is illustrated and is generally designated 300. The wireless modem 300 includes an ERW circuit 104 and a transponder 304. The transponder 304 includes an analog front end 310 having inputs connected to a modulator 320, the antenna coil 16, the capacitor 18, and outputs connected to a write decoder 324 and a bitrate generator 328. An output of the write decoder 324 is connected to a first input of a mode register 336. The mode register 336 has outputs coupled to the modulator 320 and a logic controller 338. A second input of the mode register 336 is coupled to a first output of the memory 340. The first and second outputs of the controller 338 are coupled to a first input of the memory 340 and an input register 344 of the memory 340, respectively. A voltage generator 350 has an output coupled to the input register 344. The memory 340 is coupled to the memory 112 of a host 116. Skilled artisans can appreciate that the memory 340 of the transponder 304 can be combined with the memory 112 of the host in a manner similar to the embodiment shown in FIG. 3b.

The analog front end 310 generates power from the current induced on the antenna coil 16 by an RF reading excitation signal or an RF write excitation signal (magnetic field) produced by the ERW circuit 104. The analog front end 310 controls the bidirectional data communications with the ERW circuit 104. The analog front end 310 rectifies the AC coil voltage to generate a DC supply voltage to power the transponder 304 and extracts a clock signal from the AC coil voltage. The analog front end 310 selectively switches a load across opposite nodes of the antenna coil 16 for data transmission from the transponder 304 to the ERW circuit 104. The analog front end 310 also detects a field gap that occurs when the ERW circuit 104 is attempting to write information into the memory 340 and/or the memory 112. As with the embodiment illustrated in FIG. 2, passwords for reading and writing can be used.

The controller 338 loads the mode register 336 with operational data from the memory 340 after power-on and periodically during reading to minimize errors. The controller 338 controls reading and writing access to the memory 340 and/or the memory 112. The controller 338 compares a password transmitted by the ERW circuit 104 to the password stored in the memory 340 to grant or deny reading or writing access to the data stored in the memory 340.

The bitrate generator 328 allows the selection of bitrates that are a fractional portion of the frequency of the RF excitation signal. Typically, the bitrate generator allows selection of the following bitrate combinations: RF/8, RF/16, RF/32, RF/40, RF/50, RF/64, RF/100, and RF/128. Other bitrate combinations can be provided if desired. The write decoder 324 determines whether a write data stream from the ERW circuit 104 is valid. The voltage generator 350 generates a supply voltage for programming the memory 340 or the memory 112 during a write data stream. The mode register 336 stores the mode data from the memory 340 and periodically refreshes the mode data during reading operation. The modulator 320 allows selection of various different modulation schemes including: frequency shift key (FSK); phase shift key (PSK); Manchester; biphase; and combinations thereof. The memory 340 is preferably EEPROM.

The transponder 304 can be adapted from a Temic e5550 Read/Write Identification Integrated Circuit (IDIC®) available from Temic Eurosil, Eching, Germany, by including the appropriate data input connections in a manner apparent to the skilled artisan applying the teaching of the present invention. Details of the Temic e5550 IDIC® are provided in "e5550 Standard RAN Identification IC Preliminary Product Features" dated Oct. 13, 1994 and in "e5550 Standard RNV Identification IC Preliminary Information" dated Dec. 8, 1995, (pp. 93–106), both incorporated herein by reference.

While the foregoing preferred embodiments of the invention have been described and shown, it is understood that alternatives and modifications, such as those suggested and others, may be made thereto and fall within the scope of the invention.

We claim:

1. A communication system comprising:

a host device including an electrically powered host processor for controlling operation of said host device and a host memory coupled to said host processor for storing host data relating to a condition of said host device, wherein said host processor has an operable state requiring electrical power from a power source and said host memory is controlled by said host processor in said operable state, and further wherein said host processor has an inoperable state in the absence of electrical power from said power source or during a malfunction of said host device and control of said host memory by said host processor is absent in said inoperable state;

an exciter/reader remotely positioned relative to said host device and free of electrical contact with said host device, said exciter/reader having an RF excitation signal generator for generating an RF excitation signal, an RF excitation signal transmitter coupled to said RF excitation signal generator for transmitting said RF excitation signal, an RF response signal receiver for receiving an RF response signal, and an RF response signal reader coupled to said RF response signal receiver for reading said RF response signal; and a transponder in electrical contact with said host memory, free of electrical contact with said exciter/reader and remotely positioned in RF contact with said exciter/reader, said transponder having an RF excitation signal receiver for receiving said RF excitation signal, an RF response signal generator coupled to said host memory for reading said host data from said host memory in the absence of control by said host processor in said inoperable state and generating said RF response signal, including said host data, and an RF response signal transmitter coupled to said RF response signal generator for transmitting said RF response signal to said RF response signal receiver, wherein said RF response signal reader reads said host data.

2. The communication system of claim 1 wherein said RF response signal generator includes a transponder memory coupled to said host memory for reading said host data from said host memory.

3. The communication system of claim 2 wherein said transponder memory and said host memory are integrated.

4. The communication system of claim 1 wherein said exciter/reader further includes an RF write signal generator for generating a write signal including written data and an RF write signal transmitter coupled to said RF write signal generator for transmitting said RF write signal to said transponder.

5. The communication system of claim 4 wherein said transponder further includes an RF write signal receiver for receiving said RF write signal and a programming circuit coupled to said RF write signal receiver for writing said written data to said host memory.

6. The communication system of claim 4 wherein said RF excitation signal transmitter, said RF write signal transmitter, said RF response signal receiver are integrated into a single antenna.

7. The communication system of claim 5 wherein said RF response signal transmitter, RF write signal receiver and said RF excitation signal receiver are integrated into a single antenna.

8. The communication system of claim 4 wherein said RF excitation signal generator and said RF write signal generator are integrated in a common signal source.

9. The communication system of claim 1 wherein said host device is an electrical or electro-mechanical device.

10. The communication system of claim 1 wherein said host device is a computer circuit board including a microprocessor and said host memory, wherein said microprocessor is said host processor.

11. A communication system comprising:

a host device including an electrically powered host processor for controlling operation of said host device and a host memory coupled to said host processor for storing written data relating to a condition of said host device, wherein said host processor has an operable state requiring electrical power from a power source and said host memory is controlled by said host processor in said operable state, and further wherein said host processor has an inoperable state in the absence of electrical power from said power source or during a malfunction of said host device and control of said host memory by said host processor is absent in said inoperable state;

an exciter/writer remotely positioned relative to said host device and free of electrical contact with said host device, said exciter/writer having an RF write signal generator for generating an RF write signal including said written data and an RF write signal transmitter coupled to said RF write signal generator for transmitting said RF write signal; and a transponder in electrical contact with said host memory, free of electrical contact with said exciter/writer and remotely positioned in RF contact with said exciter/writer, said transponder having an RF write signal receiver for receiving said RF write signal, and a programming circuit coupled to said RF write signal receiver for writing said written data to said host memory in the absence of control by said host processor in said inoperable state.

12. The communication system of claim 11 wherein said exciter/writer further includes an RF excitation signal generator for generating an RF excitation signal and an RF excitation signal transmitter coupled to said RF excitation signal generator for transmitting said RF excitation signal to said transponder for powering said transponder.

13. A method for remotely accessing a host memory of a host device comprising:

providing a host device having a host memory and a host processor for controlling operation of said host device, electrically powering said host processor with a power source to place said host processor in an operable state, wherein said host processor further has an inoperable state in the absence of electrical power from said power source or during a malfunction of said host device;

entering host data relating to a condition of said host device in said host memory under the control of said host processor in said operable state;

placing said host processor in an inoperable state while maintaining said host data stored in said host memory;

remotely positioning an exciter/reader relative to said host device free of electrical contact with said host device;

remotely positioning a transponder relative to said exciter/reader in RF contact with said exciter/reader and free of electrical contact with said exciter/reader;

generating an RF excitation signal with said exciter/reader and transmitting said RF excitation signal to said transponder;

electrically contacting said transponder with said host memory and reading said host data from said host memory in the absence of control by said host processor in said inoperable state;

generating an RF response signal including said host data with said transponder in response to said RF excitation signal and transmitting said RF response signal to said exciter/reader;

receiving said RF response signal with said exciter/reader; and reading said host data with said exciter/reader.

14. The method recited in claim 13 further comprising:

including a first password in said RF excitation signal;

comparing said first password to a second password stored in a transponder memory; and blocking transmission of said RF response signal if said first password does not match said second password.

15. The method recited in claim 13 wherein said exciter/reader has a writer and said method further comprises generating an RF write signal including written data with said writer.

16. The method recited in claim 15 further comprising writing said written data to said host memory with said transponder while said host processor is in said inoperable state.

17. The method recited in claim 16 further comprising:

including a first password in said RF write signal;

comparing said first password to a second password stored in a transponder memory; and preventing writing of said written data into said host memory if said first password does not match said second password.

18. The method recited in claim 13 wherein said host device is a computer circuit board including a microprocessor and said host memory, wherein said microprocessor is said host processor.

19. A method for remotely accessing a host memory of a host device comprising:

providing a host device having a host memory and a host processor for controlling operation of said host device;

electrically powering said host processor with a power source to place said host processor in an operable state, wherein said host processor further has an inoperable state in the absence of electrical power from said power source or during a malfunction of said host device;

placing said host processor in an inoperable state;

remotely positioning an exciter/writer relative to said host device free of electrical contact with said host device;

remotely positioning a transponder relative to said exciter/writer in RF contact with said exciter/writer and free of electrical contact with said exciter/writer;

electrically powering said exciter/writer to generate an RF write signal including written data relating to a condition of said host device and transmitting said RF write signal to said transponder; and electrically contacting said host memory with said transponder and writing said written data to said host memory with said transponder in the absence of control by said host processor in said inoperable state.

20. The method recited in claim 19 wherein said host device is a computer circuit board including a microprocessor and said host memory, wherein said microprocessor is said host processor.

21. The communication system of claim 1 wherein said power source is external to said host device.

22. The communication system of claim 21 wherein said power source is a first power source and said host memory is powered by a second power source internal to said host device when said host processor is in said inoperable state.

23. The communication system of claim 22 wherein said second power source is a battery.

24. The communication system of claim 1 wherein said host memory is an EEPROM.

25. The communication system of claim 1 wherein said host memory is powered by said RF excitation signal when said host processor is in said inoperable state.

26. The method recited in claim 13 wherein said power source is external to said host device.

27. The method recited in claim 26 wherein said power source is a first power source, the method further comprising powering said host memory with a second power source internal to said host device while said host processor is in said inoperable state.

28. The method recited in claim 27 wherein said second power source is a battery.

29. The method recited in claim 13 wherein said host memory is an EEPROM.

30. The method recited in claim 13 further comprising powering said host memory with said RF excitation signal when said host processor is in said inoperable state.

* * * * *